US010489279B2

(12) United States Patent
Rajagopalan et al.

(10) Patent No.: US 10,489,279 B2
(45) Date of Patent: *Nov. 26, 2019

(54) AUTOMATED TEST INPUT GENERATION FOR INTEGRATION TESTING OF MICROSERVICE-BASED WEB APPLICATIONS

(71) Applicant: International Business Machines Corporation, Armonk, NY (US)

(72) Inventors: Shriram Rajagopalan, White Plains, NY (US); Saurabh Sinha, Danbury, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/381,502

(22) Filed: Apr. 11, 2019

(65) Prior Publication Data

US 2019/0243748 A1   Aug. 8, 2019

Related U.S. Application Data

(63) Continuation of application No. 15/229,949, filed on Aug. 5, 2016, now Pat. No. 10,261,891.

(51) Int. Cl.
*G06F 11/36* (2006.01)
*G06F 9/451* (2018.01)
(Continued)

(52) U.S. Cl.
CPC ........ *G06F 11/3664* (2013.01); *G06F 3/0482* (2013.01); *G06F 9/451* (2018.02); *G06F 16/9024* (2019.01)

(58) Field of Classification Search
CPC ............. G06F 11/3664; G06F 11/3672; G06F 11/3688; G06F 2221/033
See application file for complete search history.

(56) References Cited

U.S. PATENT DOCUMENTS 6,002,871 A * 12/1999 Duggan .............. G06F 11/3664
714/38.12
8,522,212 B1   8/2013 Bhatnagar
(Continued)

FOREIGN PATENT DOCUMENTS

CN   105162884 A   12/2015
EP   2 254 310 A2   11/2010

OTHER PUBLICATIONS

Christoph C. Michael; Generating Software Test Data by Evolution; IEEE; pp. 1085-1110; retrieved on Jul. 11, 2019 (Year: 2001).*
(Continued)

*Primary Examiner* — Geoffrey R St Leger
*Assistant Examiner* — Cuong V Luu
(74) *Attorney, Agent, or Firm* — Amin, Turocy & Watson, LLP

(57) ABSTRACT

Techniques for automated generation of inputs for testing microservice-based applications are provided. In one example, a computer-implemented method comprises: traversing, by a system operatively coupled to a processor, a user interface of a microservices-based application by performing actions on user interface elements of the user interface; and generating, by the system, an aggregated log of user interface event sequences and application program interface call sets based on the traversing. The computer-implemented method also comprises: determining, by the system, respective user interface event sequences that invoke application program interface call sets; and generating, by the system, respective test inputs based on the user
(Continued)

interface event sequences that invoke the application program interface call sets.

20 Claims, 10 Drawing Sheets

(51) Int. Cl.
*G06F 3/0482* (2013.01)
*G06F 16/901* (2019.01)

(56) References Cited

U.S. PATENT DOCUMENTS

| | | | |
|---|---|---|---|
| 8,689,096 | B2 | 4/2014 | Bross et al. |
| 8,813,065 | B2 | 8/2014 | Zygmuntowicz et al. |
| 8,930,916 | B1 | 1/2015 | Soeder et al. |
| 9,021,416 | B2 | 4/2015 | Grechanik et al. |
| 9,311,171 | B1 | 4/2016 | Maes et al. |
| 9,591,000 | B2 | 3/2017 | Shokhrin et al. |
| 2005/0066307 | A1 | 3/2005 | Patel et al. |
| 2006/0156314 | A1 | 7/2006 | Waldorf |
| 2008/0178045 | A1* | 7/2008 | Son .................. G06F 11/3672 714/38.14 |
| 2008/0215925 | A1 | 9/2008 | Degenaro et al. |
| 2008/0288965 | A1 | 11/2008 | Grechanik et al. |
| 2009/0138898 | A1 | 5/2009 | Grechanik et al. |
| 2009/0276469 | A1 | 11/2009 | Agrawal et al. |
| 2010/0064282 | A1 | 3/2010 | Triou et al. |
| 2010/0287412 | A1 | 11/2010 | Cha et al. |
| 2010/0299437 | A1 | 11/2010 | Moore |
| 2012/0278127 | A1 | 11/2012 | Kirakosyan et al. |
| 2013/0246853 | A1 | 9/2013 | Salame |
| 2013/0262938 | A1 | 10/2013 | Schmitt et al. |
| 2013/0326487 | A1 | 12/2013 | Yousouf et al. |
| 2014/0059522 | A1 | 2/2014 | Chandra et al. |
| 2014/0189648 | A1* | 7/2014 | Everitt ............... G06F 11/3664 717/125 |
| 2014/0201583 | A1 | 7/2014 | Thomas |
| 2014/0229920 | A1 | 8/2014 | Rossi |
| 2015/0081243 | A1 | 3/2015 | Ganai et al. |
| 2015/0121401 | A1 | 4/2015 | Laredo et al. |
| 2015/0169432 | A1 | 6/2015 | Sinyagin et al. |
| 2015/0169434 | A1 | 6/2015 | De Angelis et al. |
| 2015/0212923 | A1 | 7/2015 | Sugiyama et al. |
| 2015/0220333 | A1 | 8/2015 | Soeder et al. |
| 2015/0254171 | A1 | 9/2015 | Harden et al. |
| 2015/0293824 | A1 | 10/2015 | Peters |
| 2015/0347970 | A1* | 12/2015 | Kirtane .............. G06Q 10/101 717/103 |
| 2016/0124742 | A1 | 5/2016 | Rangasamy et al. |
| 2016/0154729 | A1 | 6/2016 | Prodan et al. |
| 2016/0373455 | A1 | 12/2016 | Shokhrin et al. |

OTHER PUBLICATIONS

Paul E. Ammann et al.; Using Model Checking to Generate Tests from Specifications; IEEE; 9 pages; retrieved on Jul. 11, 2019 (Year: 2002).*
Joe W. Duran et al.; An Evaluation of Random Testing; IEEE; pp. 438-444; retrieved on Jul. 11, 2019 (Year: 1984).*
github.com, "Hystrix: Latency and Fault Tolerance for Distributed Systems", https://github.com/Netflix/Hystrix/, 2013, 5 pages.
Bennett et al., "Chaos Monkey Released Into the Wild", http://techblog.netflix.com/2012/07/chaos-monkey-released-into-wild.html, Jul. 30, 2012, 7 pages.
Unirest.io, "Unirest for Ruby—Simplified, Lightweight HTTP Request Library", http://unirest.io/ruby.html, Feb. 18, 2016, 5 pages.
Non-Final Office Action received for U.S. Appl. No. 15/048,102 dated May 19, 2017, 31 pages.
Notice of Allowance received for U.S. Appl. No. 15/229,949 dated Nov. 23, 2018, 37 pages.
Mirzaei et al., "Reducing Combinatorics in GUI Testing of Android Applications", IEEE International Conference on Software Engineering, URL : https://dl.acm.org/citation .cfm?id=2884853, May 2016, pp. 559-570.
Ganov et al., "Test Generation for Graphical User Interfaces Based on Symbolic Execution", URL : https://dl.acm.org/citation.cfm?id=1370050, May 11, 2008, pp. 33-40.
Emmi et al., "Dynamic Test Input Generation for Database Applications", URL : https://dl.acm.org/citation .cfm?id=1273484, Jul. 2007, pp. 151-161.
Wassermann et al., "Dynamic Test Input Generation for Web Applications", URL : https://dl.acm.org/citation.cfm?id=1390661, Jul. 2008), pp. 249-259.
Palka et al., "Testing an Optimising Compiler by Generating Random Lambda Terms", URL : https://dl.acm.org/citation.cfm?id=1982615, May 2011, pp. 91-97.
Appelt et al., "Automated Testing for SQL Injection Vulnerabilities An Input Mutation Approach", URL : https://di.acm .org/citation.cfm?id=2610403, Jul. 2014, pp. 259-269.
Vianden et al., "Experience on a Microservice-Based Reference Architecture for Measurement Systems", 21st Software Engineering Conference {APSEC), IEEE, Dec. 2014, vol. 1, No. 4, pp. 183-190.
Atwood et al., "Secure Web-Based Access for Productive Supercomputing", Computing in Science & engineering,, IEEE, Jan./Feb. 2016, pp. 63-72.
"Method and System for Enabling a PaaS System to Forecast Near-Term Service Consumption," Disclosed anonymously, Sep. 2015, 4 pages, IPCOM000243130D.
Elbaum et al., "Leveraging user-session data to support web application testing," IEEE Transactions on Software engineering, Mar. 2005, vol. 31, No. 3, pp. 187-202.
Sprenkle et al., "A case study of automatically creating test suites from web application field data", TAV-WEB, Jul. 17, 2006, 31 pages.
Mesbah et al., "Invariant-based automatic testing of AJAX user Interfaces", 31st International Conference on Software Engineering (ICSE'09), IEEE Computer Society, 2009, 16 pages.
Fard et al., "Leveraging Existing Tests in Automated Test Generation for Web Applications", ASE '14, Sep. 15-19, 2014, pp. 67-78.
Bartolini et al., "WS-TAXI: A WSDL-based testing tool for web services", International Conference on Software Testing Verification and Validation (ICST), 2009, pp. 326-335.
Bertolino et al., "Automatic synthesis of behavior protocols for composable web-services", Aug. 2009, pp. 141-150.
Xu et al., "Testing web services by XML perturbation", IEEE Computer Society, 2005, 10 pages.
Heorhiadi, Viktor, "Failure Recovery Testing Framework for Microservice-Based Applications", U.S. Appl. No. 15/048,102, filed Feb. 19, 2016, 56 pages.
List of IBM Patents or Applications Treated as Related.
Non-Final Office Action received for U.S. Appl. No. 15/229,949 dated Feb. 21, 2018, 28 pages.
Final Office Action received for U.S. Appl. No. 15/229,949 dated Jun. 29, 2018, 24 pages.
Notice of Allowance received for U.S. Appl. No. 15/229,949 dated Sep. 12, 2018, 29 pages.
Rapps et al.; Selecting Software Test Data Using Data Flow Information, IEEE Transactions on Software Engineering, URL : https://ieeexplore.ieee.org/stamp/stamp.jsp?tp=&arnumber=1702019, Apr. 1985, vol. 11, No. 4, pp. 367-375.
Zhu, Hong, "Software Unit Test Coverage and Adequacy", ACM Computing Surveys, URL : https://dl.acm.org/citation.cfm?id=267590, Dec. 1997) vol. 29, No. 4, pp. 366-427.
Korel, Bogdan, Automated Software Test Data Generation, IEEE Transactions on Software Engineering, URL : https://ieeexplore.ieee.org/stamp/stamp.jsp?tp=&arnumber=57624, vol. 16, No. 08, Aug. 1990, pp. 870-879.
Fraser et al., "EvoSuite Automatic Test Suite Generation for Object-Oriented Software", URL : https://dl.acm.org/citation.cfm?id=2025179, Sep. 5-9, 2011, pp. 416-419.
Cohen et al., "The Combinatorial Design Approach to Automatic Test Generation", IEEE Software, URL : https://ieeexplore.ieee.org/stamp/stamp.jsp?tp=&arnumber=536462, Sep. 1996, pp. 83-88.

(56) References Cited

OTHER PUBLICATIONS

Offutt, A., Jefferson, "Investigations of the Software Testing Coupling Effect", ACM Transactions on Software Engineering and Methodology, URL : https://dl.acm.org/citation .cfm?id= 125473, Jan. 1992, vol. 1, No. 1, pp. 5-20.
Github, "Chaos Monkey", Netflix/Simian Army, URL : https://github.com/Netflix/SimianArmy/wiki/Chaos-Money, Aug. 1, 2017, 1 page.
Daya et al., "Microservices from Theory to Practice: Creating Applications in IBM Bluemix Using the Microservices Approach", IBM International Technical Support Organization, Aug. 2015, 170 pages.
Lewis et al., "Microservices", URL : http://martinfowler.com/articles/microservices.html, Mar. 25, 2014, pp. 1-15.
Aguilera et al., "Failure Detection and Consensus in the Crash-Recovery Model", Distributed Computing, Apr. 2000, vol. 13, No. 2, pp. 99-125.
Chow et al., "The Mystery Machine: End-to-End Performance Analysis of Large-Scale Internet Services", 11th USENIX Symposium on Operating Systems Design and Implementation (OSDI), Oct. 6-8, 2014, pp. 217-231.
Dawson et al., "Testing of Fault-Tolerant and Real-Time Distributed Systems via Protocol Fault Injection", IEEE 26th Annual International Symposium on Fault-Tolerant Computing (FTCS), Jun. 25-27, 1996, pp. 404-414.
Fielding, Roy, Thomas, "Architectural Styles and the Design of Network-Based Software Architectures", University of California, Ph.D. Dissertation, 2000, 180 pages.
Gunawi et al., "Fate and Destini: A Framework for Cloud Recovery Testing", 8th USENIX Conference on Networked Systems Design and Implementation (NSDI), Mar. 2011, pp. 239-252.
Han et al., "DOCTOR: An Integrated Software Fault Injection Environment", International Computer Performance and Dependability Symposium (IPDS), Apr. 24-26, 1995, pp. 204-213.
Joshi et al., "PreFail: A Programmable Tool for Multiple-Failure Injection", ACM International Conference on Object Oriented Programming Systems Languages and Applications, (OOPSLA), Oct. 22-27, 2011, vol. 46, No. 10, pp. 171-187.
Juszczyk et al., "Script-Based Generation of Dynamic Testbeds for SOA", IEEE International Conference on Web Services (ICWS), Jul. 5-10, 2010, pp. 195-202.
Kropp et al., "Automated Robustness Testing of Off-the-Shelf Software Components", 28th Annual International Symposium on Fault-Tolerant Computing (FTCS), Jun. 23-25, 1998, pp. 1-10.
Yang et al., "MoDist: Transparent Model Checking of Unmodified Distributed Systems", 6th USENIX Symposium on Networked Systems Design and Implementation (NSDI), Apr. 22, 2009, pp. 213-228.
Reynolds et al., "Pip: Detecting the Unexpected in Distributed Systems", 3rd Symposium on Networked Systems Design & Implementation (NSDI), May 2006, pp. 115-128.
Sigelman et al., "Dapper, a Large-Scale Distributed Systems Tracing Infrastructure", Google Technical Report, Apr. 2010, 14 pages.
Cooper, Richard, "BBC Online Outage on Saturday Jul. 19, 2014", URL : http://www.bbc.co.uk/blogs/internetlentries/a37b0470-47d4-3991-82bb-a7d5b8803771, Jul. 22, 2014, 3 pages.
circleci.com, "DB Performance Issue—Incident Report for CircleCI", http://status.circleci.com/incidents/hr0mm9xmm3x6, Jul. 14, 2015, 7 pages.
Dockercon, "Enabling Continuous (Food) Delivery at GrubHub", https://dockercon2015.sched.org/event/39SB/enabling-continuous-food-delivery-at-grubhub, Jun. 22, 2015, 3 pages.
Bloom, Zack, "How We Deploy 300 Times a Day", HubSpot Product and Engineering Blog, URL : http://product.hubspot.com/blog/how-we-deploy-300-times-a-day, Nov. 18, 2013, 13 pages.
Dockercon, "Enabling Microservices@Orbitz", URL : https://dockercon2015.sched.org/event/39S6/enabling-microservices-orbitz, Jun. 22, 2015, 3 pages.
The Joyent Team, "Postmortem for Jul. 27 Outage of the Manta Service", https://www.joyent.com/blog/manta-postmortem-June-27-2015, Aug. 3, 2015, 5 pages.
Serebryany et al., "SmartStack: Service Discovery in the Cloud", Open Source, URL : http://nerds.airbnb.com/smartstack-service-discovery-cloud/, Oct. 23, 2013, 8 pages.
Montalenti, Andrew, "Kafkapocalypse: A Postmortem on Our Service Outage", URL : http://blog.parsely.com/post/1738/ kafkapocalypse/, Mar. 31, 2015, 14 pages.
Garcia, David, Poblador, I, "Incident Management at Spotify", URL : https://labs.spotify.com/2013/06/04/incident-management-at-spotify/, Jun. 4, 2013, 5 pages.
stackdriver.com, "Report on Oct. 23 Stackdriver Outage", http://www.stackdriver.com/post-mortem-october-23-stackdriver-outage/, Oct. 31, 2013, 9 pages.
twilio.com, "Billing Incident Post-Mortem: Breakdown, Analysis and Root Cause", https://www.twilio.com/blog/2013/07/billing-incident-post-mortem-breakdown-analysis-and-root-cause.html, Jul. 23, 2013, 09 pages.
Aniszczyk, Chris, "Distributed Systems Tracing with Zipkin", URL : https://blog.twitter.com/2012/distributed-systems-tracing-with-zipkin, Jun. 7, 2012, 3 pages.
wordpress.org, "EiasticPress Plugin: Integrate Elasticsearch with WordPress", https://wordpress.org/plugins/elasticpress/, Mar. 3, 2016, 3 pages.
Elastic.co, "An Introduction to the ELK Stack", https://www.elastic.co/webinars/introduction-elk-stack, Feb. 18, 2016, 2 pages.

\* cited by examiner

AUTOMATED TEST INPUT GENERATION FOR INTEGRATION TESTING OF MICROSERVICE-BASED WEB APPLICATIONS

BACKGROUND

The subject disclosure relates to automatically generating test inputs for testing of microservices of a microservices-based application.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate automatically generating test inputs for testing of microservices of a microservices-based application are described.

According to an embodiment, a system is provided. The system comprises a memory that stores computer executable components; and a processor that executes the computer executable components stored in the memory. The computer executable components can comprise a user interface crawling component that traverses a user interface of a microservices-based application by performing actions on user interface elements of the user interface. The computer executable components can also comprise an event sequence component that generates an aggregated log of user interface event sequences and application program interface call sets based on the traversal of the user interface, and determines respective user interface event sequences that invoke application program interface call sets. The computer executable components can also comprise a test input recording component that generates respective test inputs based on the user interface event sequences that invoke the application program interface call sets.

In another embodiment a computer-implemented method is provided. The computer-implemented method can comprise traversing, by a system operatively coupled to a processor, a user interface of a microservices-based application by performing actions on user interface elements of the user interface. The computer-implemented method can also comprise generating, by the system, an aggregated log of user interface event sequences and application program interface call sets based on the traversing. The computer-implemented method can also comprise determining, by the system, respective user interface event sequences that invoke application program interface call sets. The computer-implemented method can also comprise generating, by the system, respective test inputs based on the user interface event sequences that invoke the application program interface call sets.

In another embodiment, a computer program product for performing resiliency testing of application program interface call subgraph associated with a user interface of a microservices-based application is provided. The computer program product can comprise a computer readable storage medium having program instructions embodied therewith. The program instructions can be executable to traverse a user interface of a microservices-based application by performing actions on user interface elements of the user interface, generate an aggregated log of user interface event sequences and application program interface call sets based on the traversing, determine respective user interface event sequences that invoke application program interface call sets and generate respective test inputs based on the user interface event sequences that invoke the application program interface call sets.

DETAILED DESCRIPTION

Figure 1:
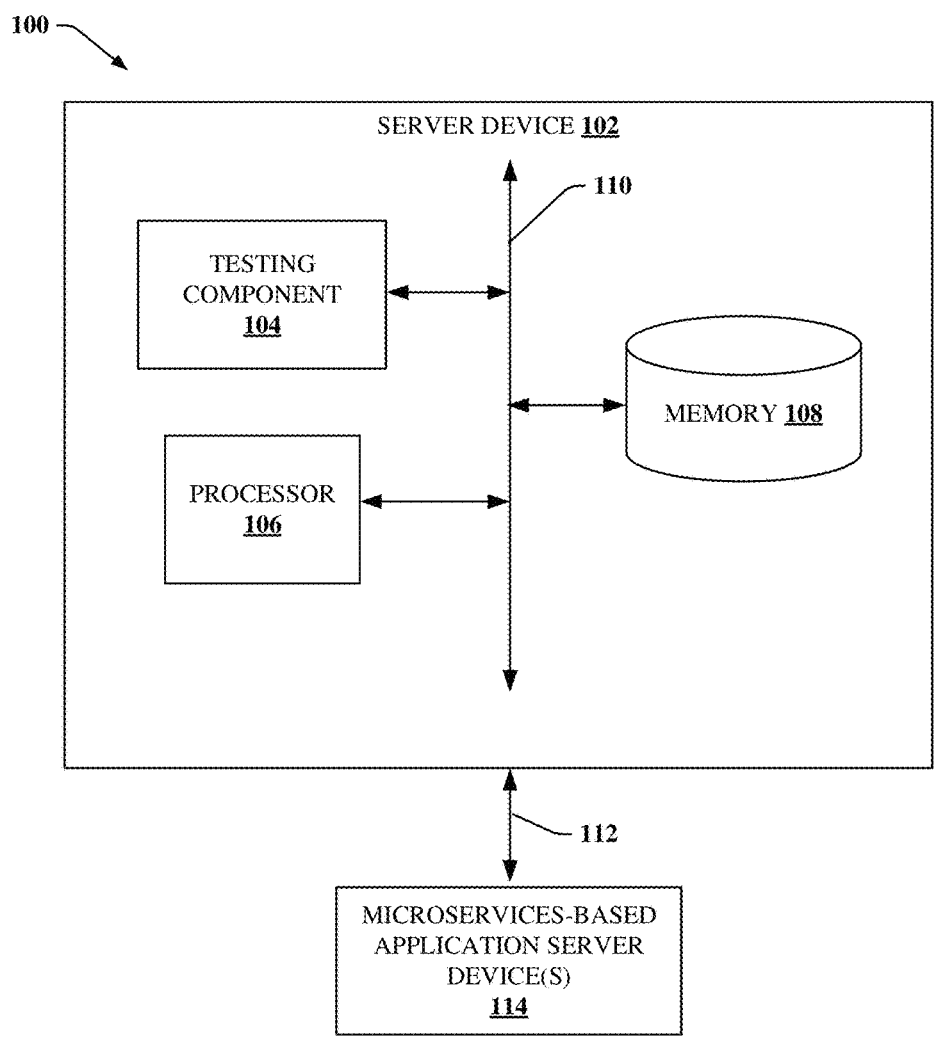
FIG. 1 illustrates a block diagram of an example, non-limiting system that facilitates automatically generating test inputs for testing of microservices of a microservices-based application and automatically testing a large and complex application program interface (API) call graph associated with the microservices-based application using the automatically generated test inputs in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident; however in various cases, that the one or more embodiments can be practiced without these specific details.

Modern web-based applications, irrespective of scale, are distributed, heterogeneous and can evolve rapidly in a matter of hours to respond to user feedback. This agility is enabled by the use of a fine-grained service-oriented architecture, referred to as a microservice architecture. A microservice is a web service that serves a single purpose, and exposes a set of application programming interfaces (APIs) to other microservices, which collectively implement a given application. Each microservice of a microservice-based application is developed, deployed and managed independent of other constituent microservices of the microservice-based application. New features and updates to a microservice are continually delivered in a rapid, incremental fashion, wherein newer versions of microservices are continually integrated into a production deployment. Microservice-based applications developed in this manner are extremely dynamic as they can be updated and deployed hundreds of times a day.

Microservice-based applications, should be designed for, and tested against, failures. In the past, many popular highly available Internet services (which are implemented as a microservice-based application) have experienced failures and outages (e.g., cascading failures due to message bus overload, cascading failures due to database overload, cascading failures due to degradation of core internal services, database failures, etc.). The post-mortem reports of such outages revealed missing or faulty failure handling logic, with an acknowledgment that unit and integration testing are insufficient to catch bugs in the failure recovery logic.

In this regard, microservice-based applications should be subjected to testing, such as, integration testing, which involves testing interactions between microservices, and/or resiliency testing, which involves testing the application's ability to recover from failure scenarios commonly encountered. However, splitting a monolithic application into microservices creates a dynamic software development environment that poses some key challenges to testing due to the runtime heterogeneity of the different microservices and the volatility of the code base. Indeed, microservice applications are typically polyglot, wherein application developers write individual microservices in the programming language they are most comfortable with. Moreover, a frequent experimentation and incremental software update delivery model results in microservices being constantly updated and redeployed, leaving the code base in a constant state of flux. This runtime heterogeneity and high code churn of microservices makes testing a microservice-based application highly problematic and non-trivial. In a non-limiting example, a time available and/or automated test execution resources available can be limited to perform testing on modifications to a microservice-based application prior to deployment in a live environment for employment of the microservices-based application by end users. For example, the time available to perform testing can be on the order of a few minutes with insufficient automated test execution resources available to perform testing on the entire microservices-based application in the time available.

There are various challenges for testing of a microservice-based application. While a microservice-based application is fundamentally a distributed application, a microservice-based application differs from distributed file systems, distributed databases, distributed co-ordination services, etc. The latter group of applications have complex distributed state machines with a large number of possible state transitions. While existing tools for testing cater to the needs of these traditional low-level distributed applications, we find these tools to be unsuitable for use in web/mobile focused microservice applications, due to various challenges, as follows.

For example, a distributed microservice-based application can be composed of various microservices written in different programming languages, wherein such microservices can use any database of their choice, to persist their state. Microservices may also be re-written at any time using a different programming language, as long as they expose the same set of APIs to other services. Consequently, approaches that rely on language specific capabilities (e.g., code analysis, dynamic code injection in Java) for test input generation, fault injection, and verification are not feasible in such heterogeneous environments, as runtime heterogeneity does not support these capabilities. In addition, microservices are autonomously managed by independent teams, whereby new versions of microservices can be deployed 10-100 times a day, independent of other services. Exhaustive checkers cannot keep up with this time scale. Randomized failure injection, on the other hand, does not provide the ability to test against specific failure scenarios that pertain to a set of recently deployed microservices.

To address the challenges in testing of a polyglot distributed application as described herein, exemplary embodiments of the invention provide testing frameworks that operate irrespective of an application programming language, platform, or logic. These testing frameworks take into consideration that irrespective of runtime heterogeneity, all communication between constituent microservices of a microservice-based application occurs entirely over a network. The constituent microservices work in coalition to generate a response to an end user request. Accordingly, based on the reliance of the constituent microservices to communicate through messages on a network, embodiments of the invention implement testing protocols that can emulate different types of application-level failures by intercepting and manipulating network messages/interactions between communicating microservices. For example, a network partition can be created by dropping all packets between two groups of microservices, while allowing communication within each group.

Furthermore, despite the rapid rate at which a microservice-based application evolves in a daily fashion (high code volatility), the interaction between constituent microservices of the microservice-based application can be characterized using a few simple, standard patterns such as request-response (e.g., representational state transfer (REST) over hypertext transfer protocol (HTTP), publish-subscribe using lightweight messaging systems, etc. The semantics of these application layer transport protocols and the interaction patterns are well understood. In this regard, it is possible to elicit a failure-related reaction from any microservice, irrespective of its application logic or runtime, by manipulating these interactions directly. For example, an overload of a first microservice (e.g., overloaded server) can be staged by intercepting requests (e.g., client HTTP requests) from a second microservice to the first microservice and returning an HTTP status code 503 "Service Unavailable" (or other error message) to the second microservice.

One or more embodiments disclosed herein leverage these fundamental observations to implement systems and methods for testing of microservice-based applications, wherein such systems and methods for testing are essentially network-oriented, and independent of the application code and runtime. As previously noted, in a microservice-based application, a response to a user request can be a composition of responses from different microservices that communicate over a network. In one embodiment of the invention, a testing system implements a fault model that is based on application-level failures that can be observed from the network by other microservices. A testing system injects faults into the network communication channel between microservices to stage/emulate various failure modes including fail-stop/crash failures, performance/omission failures, and crash-recovery failures, which are the most common types of failures encountered by applications in modern-day web deployments. From the perspective of a microservice making an API call, failures in a target microservice or the network manifests in the form of, e.g., delayed responses, error responses (e.g., HTTP 404, HTTP 503), invalid responses, connection timeouts, a failure to establish a connection, etc. In this regard, various failure incidents such as: (i) cascading failure due to message bus overload; (ii) cascading failures due to database overload (iii) cascading failure due to degradation of a core internal service and (iv) database failures, etc. can be emulated by a set of failure modes supported by a failure recovery testing system according to an embodiment of the invention.

One or more embodiments of the subject disclosure is directed to computer processing systems, computer-implemented methods, apparatus and/or computer program products that facilitate efficiently, effectively, and automatically (e.g., without direct human involvement) generating test inputs for testing of microservices of a microservices-based application. In order to facilitate performing testing in an environment where microservices of a microservices-based application are frequently being modified and redeployed in a live environment for employment of the microservices-based application by end users, one or more embodiments described herein include techniques involving analysis of an API call graph of microservices of a microservices-based application. The API call graph can have nodes that respectively represent APIs and edges that respectively represent calling relations between APIs. In one or more embodiments, a user interface of a microservices-based application is traversed (e.g., crawled) using automated crawling techniques. The automated crawling can perform actions on the user interface and generate a log of user interface events, some of which invoke APIs associated with microservices and generate respective server-side request logs associated with invocation of APIs. Entries in the log of user interface events and server-side request logs can have time synchronized timestamps. The entries from the log of user interface events and server-side request logs can be merged into an aggregated log where the entries are listed in time synchronized order. The aggregated log can be analyzed to identify user interface event entries that trigger invocations of API call sets (e.g., a single API call and/or a sequence of API calls). The edges of the API call graph can be annotated with coverage indications indicating whether the call relations between APIs associated with the edges were exercised by the invocations of the API call sets. The information associated with the user interface event entries that trigger invocations of the API call sets can be recorded as test inputs. It is to be appreciated that the respective test inputs can be recorded along with an indication of the edges of the API call graph that are covered by the test input. The annotated API call graph can be analyzed to determine whether the coverage indications meet one or more coverage criterion. If the one or more coverage criterion is not met, then selected user interface event entries associated with calling APIs associated with edges indicating no coverage can be used with mutated parameters for automated re-crawling to re-determine coverage indications. This can be iteratively performed until the coverage criteria is met. If the one or more coverage criterion is met, then the recorded test inputs and coverage information associated with the coverage indications can be output for storage, reporting, automated testing of the microservices of the microservices-based application, and/or any other suitable purpose. The automatic testing of the microservices of the microservices-based application can be performed using the test inputs.

The computer processing systems, computer-implemented methods, apparatus and/or computer program products can employ hardware and/or software to solve problems that are highly technical in nature (e.g., related to automated generation of test inputs for testing of microservices of a microservices-based application, and automated testing of the microservices of the microservices-based application using the automatically generated test inputs) that are not abstract and that cannot be performed as a set of mental acts by a human. For example, a human, or even thousands of humans, cannot efficiently, accurately and effectively manually perform testing on an API call graph on a microservices-based application that has thousands or tens of thousands of microservices in a few minutes that are available prior to deployment of the microservices-based application in a live environment for employment of the microservices-based application by end users. One or more embodiments of the subject computer processing systems, methods, apparatuses and/or computer program products can enable the automated generation of test inputs for testing of microservices of a microservices-based application, and automated execution of testing of a large and complex API call graph associated with the microservices-based application in a highly accurate and efficient manner using the automatically generated test inputs. By employing automated crawling of a user interface of a microservices-based application, automated analysis of an API call graph associated with the microservices-based application based on the crawling to generate test inputs and determine coverage of the API call graph by the test inputs, and automated execution testing of a large and complex API call graph using the automatically generated test inputs, the processing time and/or accuracy associated with the existing automated testing systems is substantially improved. Further, one or more embodiments of the subject techniques facilitate improved performance of automated testing systems that provides for more efficient usage of test processing resources in a limited available time, and reduced storage requirements by recording test inputs until a coverage criteria is met, reducing redundancy of testing of API calls by using test inputs generating according to a coverage criteria, and executing the testing of a large and complex API call graph associated with the microservices-based application using the automatically generated test inputs.

FIG. 1 illustrates a block diagram of an example, non-limiting system 100 that facilitates automatically generating test inputs for testing of microservices of a microservices-based application and automatically testing a large and complex API call graph associated with the microservices-based application using the automatically generated test inputs in accordance with one or more embodiments described herein. Aspects of systems (e.g., system 100 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. Repetitive description of like elements employed in one or more embodiments described herein is omitted for sake of brevity.

As shown in FIG. 1, the system 100 can include a server device 102, one or more networks 112 and one or more microservices-based application server devices 114. The server device 102 can include testing component 104 that can facilitate automatically generating test inputs for testing of microservices of a microservices-based application and automatically testing a large and complex API call graph associated with the microservices-based application using the automatically generated test inputs. The server device 102 can also include or otherwise be associated with at least one included memory 108 that stores computer executable components (e.g., computer executable components can include, but are not limited to, the testing component 104 and associated components). The server device 102 can also include or otherwise be associated with at least one processor 106 that executes the computer executable components stored in the memory 108. The server device 102 can further include a system bus 110 that can couple the various components including, but not limited to, the testing component 104, memory 108 and/or processor 106. While a server device 102 is shown in FIG. 1, in other embodiments, any number of different types of devices can be associated with or include the components shown in FIG. 1 as part of the testing component 104. For example, microservices-based application server devices 114 can include all or some of the components of testing component 104. All such embodiments are envisaged.

Server device 102 can be any computing device that can be communicatively coupled to microservices-based application server devices 114, non-limiting examples of which can include a server computer, a computer, a mobile computer, a mainframe computer, an automated testing system, a network storage device, a communication device, a web server device, a network switching device, a network routing device, a gateway device, a network hub device, a network bridge device, a control system, or any other suitable computing device. A microservices-based application server device 114 can be any device that executes microservices, non-limiting examples of which can include server device, and/or any other suitable device that can execute microservices. It is to be appreciated that server device 102, and/or microservices-based application server device 114 can be equipped with communication components (not shown) that enable communication between server device 102 and/or microservices-based application server device 114 over one or more networks 112.

The various components (e.g., testing component 104, memory 108, processor 106, server device 102, microservices-based application server devices 114, and/or other components) of system 100 can be connected either directly or via one or more networks 112. Such networks 112 can include wired and wireless networks, including, but not limited to, a cellular network, a wide area network (WAN) (e.g., the Internet), or a local area network (LAN), non-limiting examples of which include cellular, WAN, wireless fidelity (Wi-Fi), Wi-Max, WLAN, radio communication, microwave communication, satellite communication, optical communication, sonic communication, electromagnetic induction communication, or any other suitable communication technology.

Figure 2:
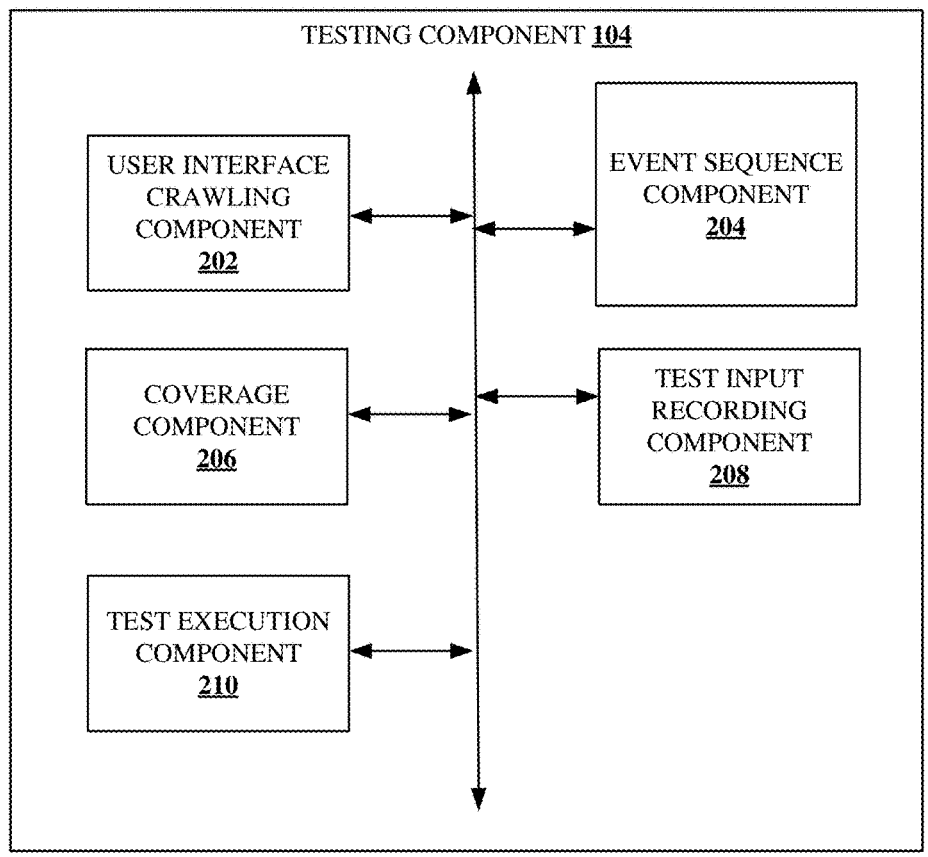
FIG. 2 illustrates a block diagram of an example, non-limiting testing component that can automatically generate test inputs for testing of microservices of a microservices-based application and automatically test a large and complex application program interface (API) call graph associated with the microservices-based application using the automatically generated test inputs in accordance with one or more embodiments described herein.

FIG. 2 illustrates a block diagram of an example, non-limiting testing component 104 in accordance with one or more embodiments described herein. Testing component 104 can include user interface crawling component 202 that can automatically traverse a user interface of a microservices-based application using automated crawling techniques. Testing component 104 can also include event sequence component 204 that can analyze logs generated based on the automated traversal to identify user interface event entries that trigger invocations of API call sets of an API call graph. Testing component 104 can also include coverage component 206 that can analyze an API call graph and determine a coverage of the API call graph based on the invocations of the API call sets. Testing component 104 can also include test input recording component 208 that can record information associated with the user interface event entries that trigger invocations of the API call sets as test inputs. Testing component 104 can also include test execution component 210 that can automatically test (e.g., integration tests, resiliency tests, or any other suitable tests) the microservices of the microservices-based application associated with the API call graph using the automatically generated test inputs.

User interface crawling component 202 can automatically traverse a user interface of a microservices-based application using automated crawling techniques according to a traversal pattern (e.g., breadth first traversal pattern, depth first traversal pattern, best first traversal pattern, monte carlo tree traversal or any other suitable traversal pattern). For example, user interface crawling component 202 can traverse the user interface and exercise (e.g., mimicking a user performing actions) actionable user interface elements (e.g., link, textbox, button, checkbox, combo-box, radio button, drop-down list, list box, dropdown button, toggle, date and time selector, slider, menu, free-from text field, widget, icon, search field, image carousel, tag, pagination, breadcrumb, or any other suitable user interface element) of the user interface. User interface crawling component 202 can also store details regarding the exercising of the actionable user interface elements of the user interface, such as in a non-limiting example, user interface element that was exercised, an action performed on the user interface element, a data value(s) associated with the user interface element when the user interface element was exercised, or any other suitable information associated with exercising of the user interface elements. For example, the details can comprise suitable information that can be employed by components described herein to uniquely identify a corresponding entry in a user interface event log, a server-side request log, and/or an aggregated log. It is to be appreciated that user interface crawling component 202 can be provided access to information that enable automatically traversing certain restricted portions of the user interface, such as in a non-limiting example, login identification, password, or any other suitable information to enable automatically traversing certain restricted portions of the user interface.

Exercising user interface elements by user interface crawling component 202 can result in a user interface event log being generated by a logging agent of server device 102. User interface event log can include entries respectively representing user interface events corresponding to user interface crawling component 202 exercising user interface elements of the user interface. In a non-limiting example, user interface event log entry associated with a user interface event can include a timestamp, an event_id, a UI element name, a UI element identification, a description of action performed, or any other suitable information associated with a user interface event. Some of the user interface events can cause invocation of API calls associated with microservices on one or more microservices-based application server devices 114. The invocation of an API call associated with a microservice on a microservices-based application server device 114 can cause a logging agent on microservices-based application server device 114 to generate a server-side request log (e.g., HTTP access log format, syslog format, or any other suitable server side log) that can include entries respectively representing API calls to APIs.

Figure 3:
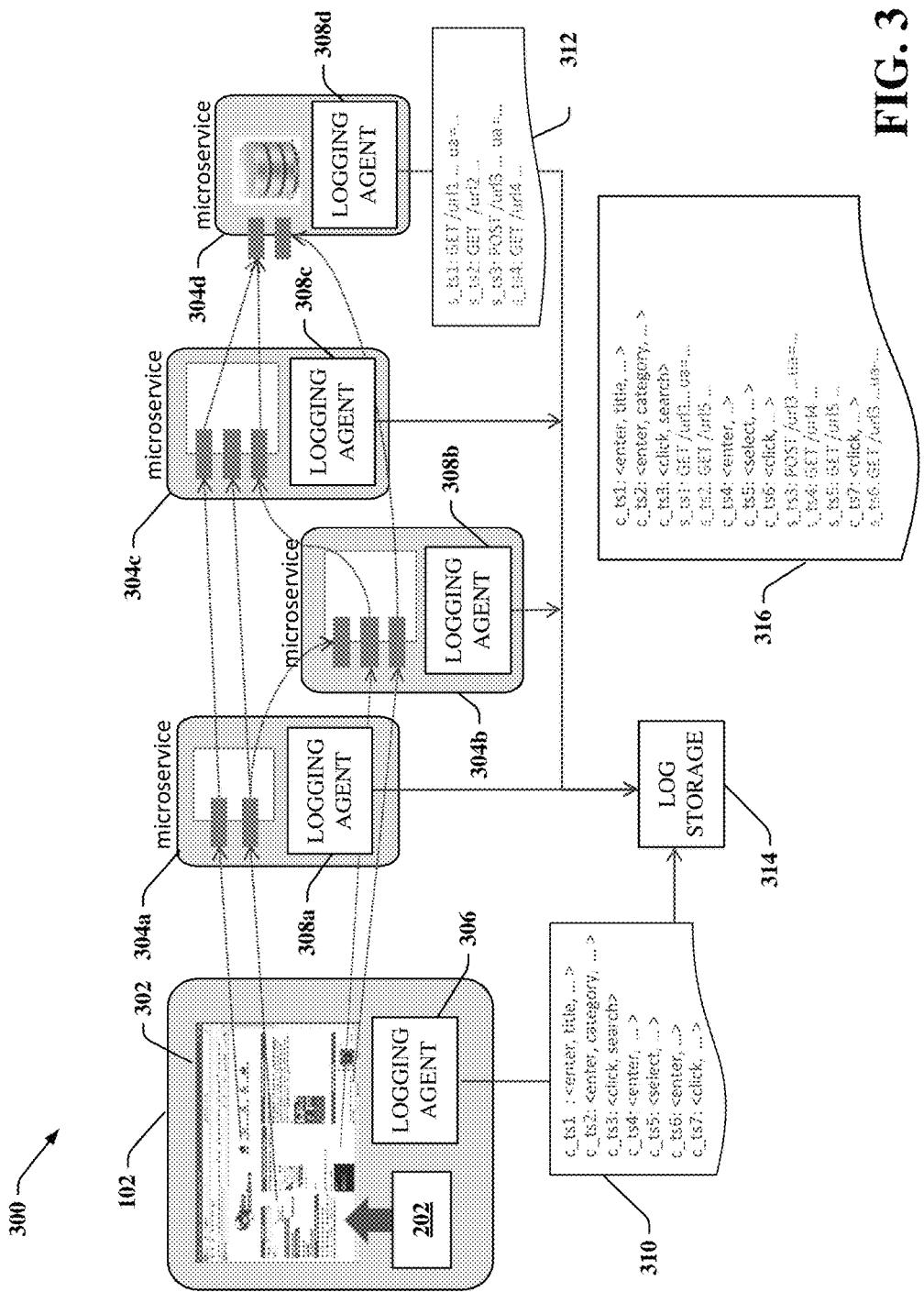
FIG. 3 illustrates a block diagram of an example, non-limiting system for testing of a microservices-based application in accordance with one or more embodiments described herein.

FIG. 3 illustrates a block diagram of an example, non-limiting system 300 for testing of a microservices-based application in accordance with one or more embodiments described herein. System 300 can include a server device 102 and microservices 304a, 304b, 304c, 304d. Microservices 304a, 304b, 304c, and 304d can be located on one or more microservices-based application server devices 114. While system 300 depicts four microservices for illustration purposes, it is to be appreciated that system 300 can include suitable number of microservices. For example, a large and complex microservices-based application, can have thousands of microservices distributed on hundreds of microservices-based application server devices 114.

Server device 102 depicts user interface crawling component 202 exercising user interface elements of user interface 302, which causes logging agent 306 on server device 102 to generate a user interface event log 310, and also causes invocations of API calls to microservices 304a, 304b, 304c, and 304d resulting in logging agents 308a, 308b, 308c, and 308d on one or more associated microservices-based application server devices 114 to generate server-side request logs that can include entries respectively representing the API calls. For example, logging agent 308d generated server-side request log 312 depicting API call invocations associated with microservice 304d. It is to be appreciated that some API calls can be invoked directly based upon user interface events associated with user interface 302, while other API calls can be invoked by microservices 304a, 304b, 304c, and 304d as a result of the API calls invoked directly based upon user interface events. For example, a user interface event can cause an API call invocation to microservice 304a, which causes execution of microservice 5304a that can invoke an API call to microservice 304c, which causes execution of microservice 304c that can invoke an API call to microservice 304d.

This non-limiting example depicts a separate logging agent 308a, 308b, 308c, and 308d for each microservices 304a, 304b, 304c, and 304d, however it is to be appreciated that a single logging agent can generate a server-side request log having entries associated with a plurality of microservices. For example, each microservices-based application server device 114 can have a logging agent that generates a server-side request log having entries associated with one or more microservices executing on microservices-based application server device 114.

The user interface events log 310 and/or server-side request log(s) 312 can be stored in log storage 314, which can include memory 108 and/or one or more memories associated with one or more microservices-based application server devices 114. Entries in the user interface events log 310 and server-side request log(s) 312 can have time synchronized timestamps. User interface crawling component 202 can merge the user interface events log 310 and server-side request log(s) 312 into an aggregated log 316 where the entries are listed in time synchronized order.

Referring back to FIG. 2, event sequence component 204 can automatically analyze aggregated log 316 to identify user interface events that trigger API call invocations. In this example, entries in the aggregated log 316 associated with user interface events can begin with "c_ts" and entries in aggregated log 316 associated with API call invocations can begin with "s_ts". It is to be appreciated that respective unique identifiers for user interface events and API call invocations can be different for different platforms (e.g., operating systems, programming languages, hardware, or any other suitable platforms) and can be defined in the system and accessible to event sequence component 204. In another non-limiting example, event sequence component 204 can employ artificial intelligence to analyze previous and/or current logs to learn respective unique identifiers for user interface events and API call invocations for different platforms.

Event sequence component 204 can automatically determine that a user interface event entry immediately preceding an API call invocation entry in the aggregated log indicates a user interface event associated with the user interface event entry triggered an API call invocation associated with the API call invocation entry. Furthermore, event sequence component 204 can determine that a first API call invocation entry immediately preceding a second API call invocation entry in the aggregated log indicates a first API call invocation associated with the first API call invocation entry triggered a second API call invocation associated with the second API call invocation entry, forming all or a portion of an API call invocation sequence. A single API call invocation and an API call invocation sequence are each an API call set of an API call graph of a microservices-based application. An API call graph can have nodes that respectively represent APIs and edges that respectively represent calling relations between the APIs associated with microservices of a microservices-based application. Event sequence component 204 can employ any known pre-defined relationships between different types of entries in aggregated logs in making determinations regarding which user interface event associated entries triggered API call invocations associated with other entries. Event sequence component 204 can employ artificial intelligence to analyze previous and/or current logs to learn relationships between different types of entries in aggregated logs in making determinations regarding which user interface event associated entries triggered API call invocations associated with other entries.

Referring again to FIG. 3, for example, event sequence component 204 can automatically determine that an entry in aggregated log 316 beginning with "c_ts" immediately preceding an entry in aggregated log 316 beginning with "s_ts" can be indicative of a user interface event associated with the entry beginning with "c_ts" triggering an API call invocation associated with the entry beginning with "s_ts". For example, event sequence component 204 can determine that user interface event entry "c_ts3: <click, search>" in aggregated log 316 triggered an API call set comprising API call invocation sequence including the API call invocation entry of "s_ts1: GET/url1 . . . ua= . . . " followed by the API call invocation entry of "s_ts2: GET/url2 . . . ". Furthermore, event sequence component 204 can determine that user interface event sequence comprising user interface event entry "c_ts1: <enter, title, . . . >", user interface event entry "c_ts2: <enter, category, . . . >", and user interface event entry "c_ts3: <click, search>" in aggregated log 316 set up the parameters for and triggered API call set comprising the API call invocation sequence beginning with entry of "s_ts1: GET/url1 . . . ua= . . . ".

Test input recording component 208 can record information associated with an event sequence and the API call set invoked by the event sequence as a test input for future use in automated testing by test execution component 210 to trigger invocation of the API call set associated with the test input. For example, a recorded test input can include the event sequence, an API call with a parameter-value pairs (externally visible or internal (e.g., API call between APIs)), an API call set, annotations of the API set indicating coverage of edges of the API call set by the API call with a parameter-value pairs, or any other suitable information that can be employed for triggering invocation of the API call set associated with the test input. For example, test input recording component 208 can record test input including information associated with user interface event entry "c_ts1: <enter, title, . . . >", user interface event entry "c_ts2: <enter, category, . . . >", user interface event entry "c_ts3: <click, search>" and/or "s_ts1: GET/url1 . . . ua= . . . " as a test input that triggers the API call invocation sequence (e.g., API call set) comprising the API call invocation entry of "s_ts1: GET/url1 . . . ua= . . . " followed by the API call invocation entry of "s_ts2: GET/url2 . . . ". In another example, the test input can include an API call with specific parameter-value pairs for API call invocation entry of "s_ts1: GET/url1 . . . ua= . . . ", the user interface event sequence, and/or any other suitable information that can be employed for exploring mutations of the user interface event sequence and/or triggering the API call invocation sequence. A non-limiting example of a test input comprising API call with specific parameter-value pairs can include "GET/url1 {"book_title": "mysql", "book_cat": "databases"}". The test input comprises a GET request to API "urn" with two parameter-value pairs comprising parameter "book_title" with value "mysql" and parameter "book_cat" with value "databases."

It is to be appreciated that any suitable number of user interface event entries can be included in a user interface event sequence. It is also to be appreciated that any suitable number of API call invocation entries can be included in an API call invocation sequence. Furthermore, any suitable number of parameter-value pairs can be included in a test input. The parameter-value pairs can be generated by test input recording component 208 based on detailed logging associated with API calls on the one or more microservices-based application server devices 114 and/or one or more network service proxies (not shown) that can be used to route to API calls between microservices-based application server devices 114. Additionally, the parameter-value pairs can be generated by test input recording component 208 by mapping parameters in user event log entries to parameters in server side request log entries using any suitable matching algorithm.

In another example, event sequence component 204 can determine that user interface event entry "c_ts6: <click, . . . >" in aggregated log 316 triggered the API call set comprising the API call invocation sequence comprising the API call invocation entry of "s_ts3: POST/url3 . . . ua= . . . " followed by API call invocation entry of "s_ts4: GET/url4 . . . " following by API call invocation entry of "s_ts5: GET/url5 . . . ", and that the user interface event sequence comprising user interface event entry "c_ts4: <enter, . . . ", user interface event entry "c_ts5: <select, . . . >", and user interface event entry "c_ts6: <click, . . . >" in aggregated log 316 set up the parameters for and triggered the API call set comprising API call invocation sequence beginning with entry of "s_ts3: POST/url3 . . . ua= . . . ". Test input recording component 208 can record information associated with user interface event entry "c_ts4: <enter, . . . ", user interface event entry "c_ts5: <select, . . . >", user interface event entry "c_ts6: <click, . . . >", and/or "s_ts3: POST/url3 . . . ua= . . . " as another test input that triggers the API call invocation sequence (e.g., API call set) comprising the API call invocation entry of "s_ts3: POST/url3 . . . ua= . . . " followed by the API call invocation entry of "s_ts4: GET/url4 . . . " following by API call invocation entry of "s_ts5: GET/url5 . . . ". Test input recording component 208 can record information associated with this event sequence and the API call set (e.g., API call invocation sequences) invoked by the event sequence as another test input.

In a further example, event sequence component 204 can determine that user interface event entry "c_ts7: <click, . . . >" in aggregated log 316 set up the parameters for and triggered the API call invocation entry of "s_ts6: GET/url3 . . . ua= . . . ". Test input recording component 208 can record information associated with user interface event entry "c_ts7: <click, . . . >" and/or "s_ts6: GET/url3 . . . ua= . . . " as another test input that triggers the API call invocation (e.g., API call set) of "s_ts6: GET/url3 . . . ua= . . . ".

Figure 4:
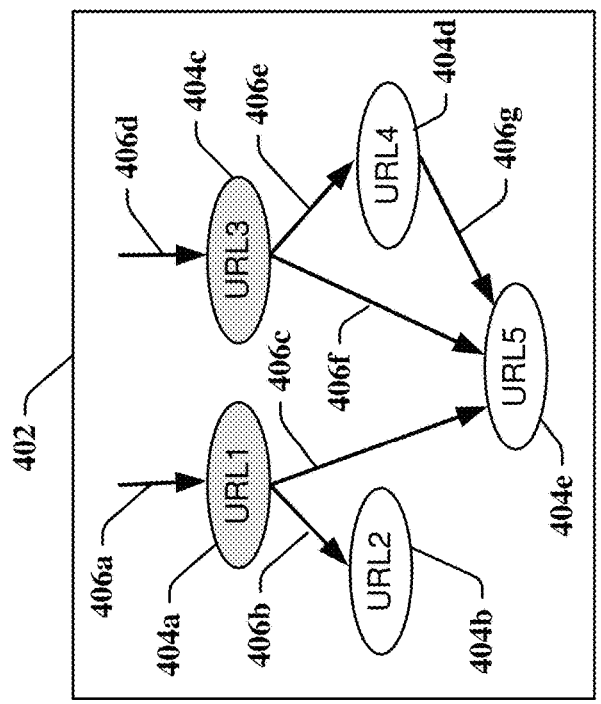
FIG. 4 illustrates a block diagram of an example, non-limiting API call graph associated with a microservices-based application in accordance with one or more embodiments described herein.

FIG. 4 illustrates a block diagram of an example, non-limiting API call graph 402 associated with a microservices-based application in accordance with one or more embodiments described herein. API call graph 402 has nodes representing APIs: URL1 404a, URL2 404b, URL3, 404c, URL4 404d, and URL 404e. API call graph 402 has edges representing calling relationships associated with APIs: 406a, 406b, 406c, 406d, 406e, 406f, and 406g. Edge 406a represents a calling relationship from an external entity (e.g., user interface, application, command line, or any other suitable entity that can call an API) to API URL1 404a. Since API URL1 404a is called from an external entity, it is an externally visible API in the API call graph. Edge 406c represents a calling relationship from an external entity to API URL1 404c, and thus API URL1 404c is also an externally visible API. Edge 406b represents a calling relationship from API URL1 404a to API URL2 404b. Edge 406c represents a calling relationship from API URL1 404a to API URL5 404e. Edge 406e represents a calling relationship from API URL3 404c to API URL4 404d. Edge 406f represents a calling relationship from API URL3 404c to API URL5 404e. Edge 406g represents a calling relationship from API URL4 404d to API URL5 404e.

While API call graph 402 depicts a limited number of APIs and edges for illustration purposes, it is to be appreciated that API call graph 402 can include any suitable number of APIs and edges. For example, a large and complex microservices-based application, and associated API call graph can have thousands of APIs and edges.

Referring back to FIG. 2, coverage component 206 can automatically annotate an API call graph of a user interface of a microservices-based application with coverage indications indicating whether the call relations between APIs associated with the edges were exercised by the invocations of the API call sets based upon an analysis of the event sequences and associated API call sets triggered by the event sequences determined by event sequence component 204. Coverage component 206 can employ a coverage indication algorithm, or any other suitable algorithm, for determining coverage indications for edges. It is to be appreciated that coverage component 206 can initialize an API call graph by annotating all edges in the API call graph as "definitely not covered" prior to a first annotation of the API call graph for coverage indications based upon an analysis of the event sequences and associated API call sets triggered by the event sequences determined by event sequence component 204. After a re-traversal of the user interface of a microservices-based application with mutated event sequences, coverage component 206 update the API call graph with any changes in the coverage indications associated with the edges.

A non-limiting example of a coverage indication algorithm can include:

Coverage Indication Algorithm
For each API call to an API r in each API call set, where the API call to API r has a user-agent attribute, annotate the edge in the API call graph from N(p) to N(r) as "definitely covered"
For each API call to an API r in each API call set, where the API call to API r has no user-agent attribute,
Identify a node N(r) in an API call graph associated with the API call set that corresponds to API r,
If N(r) has only one edge to a predecessor node N(p) corresponding to an API p invoked prior to API r in the API call set, annotate the edge in the API call graph from N(p) to N(r) as "definitely covered", and
If N(r) has only multiple edges to predecessor nodes $N(p_1) \ldots N(p_m)$, where m is a positive integer greater than 1, corresponding to APIs $p_1 \ldots p_m$ invoked prior to API r in the API call set, annotate each edge in the API call graph from $N(p_1) \ldots N(p_m)$ to N(r) as "possibly covered".

Coverage component 206 can further determine whether a "possibly covered" edge in the API call graph is "definitely covered" if the server side log entry for API r has information (e.g., transaction identifier, API call source data, or any other suitable data) that can be employed by coverage component 206 to uniquely identify an API p that invoked the API call to API r, and coverage component 206 can annotate the edge between edge in the API call graph from N(p) to N(r) as "definitely covered". It is to be appreciated that coverage component 206 can use any suitable annotations to indicate respective coverage indications for edges, non-limiting examples of which can include textual annotations, numerical annotations, graphical annotations, coded annotations, or any other suitable annotations.

Figure 5:
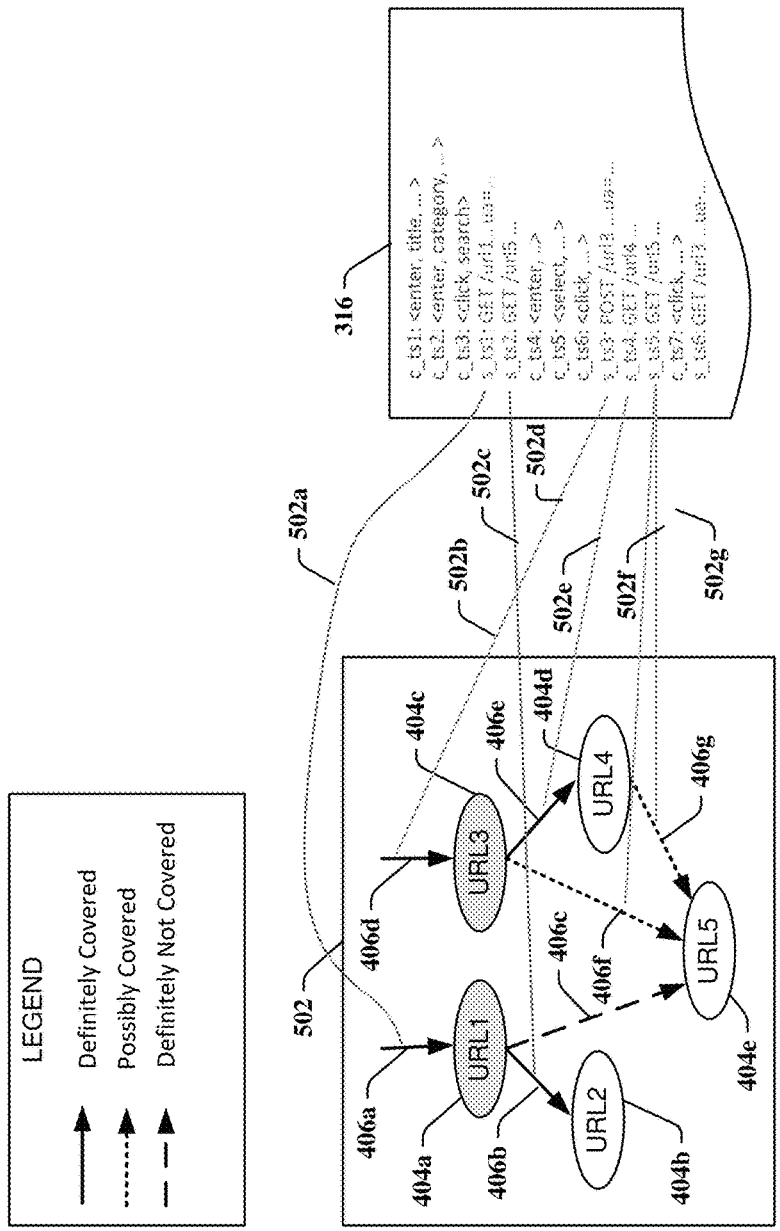
FIG. 5 illustrates a block diagram of an example, non-limiting annotated API call graph associated with a microservices-based application in accordance with one or more embodiments described herein.

FIG. 5 a block diagram of an example, non-limiting annotated API call graph 502 associated with a microservices-based application in accordance with one or more embodiments described herein. In this example, annotated API call graph 502 is based on API call graph 402. Coverage component 206 can annotate API call graph 402 based on an analysis of the event sequences and associated API call sets triggered by the event sequences determined by event sequence component 204 from aggregated log 316. For example, user interface event sequence comprises user interface event entry "c_ts1: <enter, title, . . . >", user interface event entry "c_ts2: <enter, category, . . . >", and user interface event entry "c_ts3: <click, search>" that triggered API call set comprising the API call invocation sequence including the API call invocation entry of "s_ts1: GET/url1 . . . ua= . . . " followed by the API call invocation entry of "s_ts2: GET/url2 . . . ". Using the coverage indication algorithm, coverage component 206 can annotate edge 406*a* as "definitely covered" since API call invocation entry of "s_ts1: GET/url1 . . . ua= . . . " has a user-agent attribute "ua=". Coverage component 206 can annotate edge 406*b* as "definitely covered" since API call invocation entry of ""s_ts2: GET/url2 . . . " corresponds to API URL2 404*b* which only has edges to one preceding API URL1 404*a* in the API call graph.

In another example, user interface event sequence comprising user interface event entry "c_ts4: <enter, . . . ", user interface event entry "c_ts5: <select, . . . >", and user interface event entry "c_ts6: <click, . . . >" triggered the API call set comprising API call invocation sequence beginning with entry of "s_ts3: POST/url3 . . . ua= . . . " followed by API call invocation entry of "s_ts4: GET/url4 . . . " following by API call invocation entry of "s_ts5: GET/url5 . . . ". Using the coverage indication algorithm, coverage component 206 can annotate edge 406*d* as "definitely covered" since API call invocation entry of "s_ts3: POST/url3 . . . ua= . . . " has a user-agent attribute "ua=". Coverage component 206 can annotate edge 406*e* as "definitely covered" since API call invocation entry of "s_ts4: GET/url4 . . . " corresponds to API URL4 404*b* which only has an edge to one preceding API URL3 404*c* in the API call set. Coverage component 206 can annotate edges 406*f* and 406*g* as possibly covered since API call invocation entry of "s_ts4: GET/url4 . . . " corresponds to API URL4 404*b* which only has edges to two preceding APIs URL3 404*c* and URL4 404*d* in the API call set. Edge 406*c* remains annotated as "definitely not covered" after coverage component 206 has annotate API call graph 402 based on an analysis of the event sequences and associated API call sets triggered by the event sequences determined by event sequence component 204 from aggregated log 316 to produce annotated API call graph 502.

After all of the API call sets have been analyzed by coverage component 206 to generate and/or update an annotated API call graph, coverage component 206 can analyze the annotated API call graph to determine which edges are still annotated as "definitely not covered". Coverage component 206 can determine one or more coverage metrics of the API call graph based on the coverage indications associated with the edges. In a non-limiting example, a coverage metric can be an indicator of the percent of edges in the API call graph that are still annotated as "definitely not covered", an indicator of the quantity of edges in the API call graph that are still annotated as "definitely not covered", an indicator of the percent of edges meeting a priority rank threshold in the API call graph that are still annotated as "definitely not covered", an indicator of the quantity of edges meeting the priority rank threshold in the API call graph that are still annotated as "definitely not covered", an indicator a quantity of edges annotated as "definitely not covered" that cannot be changed to "definitely covered" nor "possibly covered" through mutated event sequences performed on the user interface, and/or any other suitable coverage metric associated with edges in the API call graph based on the associated coverage indications.

Coverage component 206 can compare the one or more coverage metrics with one or more coverage criterion to determine whether user interface crawling component 202 should perform additional actions on the user interface with mutated event sequences. For example, the one or more coverage criterion can include a threshold percent of edges in the API call graph that are still annotated as "definitely not covered", that if exceeded indicates user interface crawling component 202 should perform additional actions on the user interface with mutated event sequences. In another example, the one or more coverage criterion can include a threshold quantity of edges in the API call graph that are still annotated as "definitely not covered", that if exceeded indicates user interface crawling component 202 should perform additional actions on the user interface with mutated event sequences. In an additional example, the one or more coverage criterion can include a threshold percent of edges meeting a priority rank threshold in the API call graph that are still annotated as "definitely not covered", that if exceeded indicates user interface crawling component 202 should perform additional actions on the user interface with mutated event sequences. In a further example, the one or more coverage criterion can include a threshold quantity of edges meeting the priority rank threshold in the API call graph that are still annotated as "definitely not covered", that if exceeded indicates user interface crawling component 202 should perform additional actions on the user interface with mutated event sequences. In another example, the one or more coverage criterion can include a threshold quantity of edges annotated as "definitely not covered" that cannot be changed to "definitely covered" nor "possibly covered" through mutated event sequences performed on the user interface, that if exceeded indicates user interface crawling component 202 should perform additional actions on the user interface with mutated event sequences. For example, if only edges annotated as "definitely not covered" that cannot be changed to "definitely covered" nor "possibly covered" through mutated event sequences performed on the user interface remain, then coverage component 206 can cause user interface crawling component 202 to perform additional actions on the user interface with mutated event sequences.

If coverage component 206 determines that user interface crawling component 202 should perform additional actions on the user interface with mutated event sequences, coverage component can provide information to user interface crawling component 202 related to one or more event sequences associated with externally visible APIs in the API call graph that are connected to the edge directly or indirectly through at least one other edge and/or at least one other API. Continuing with the example in FIG. 5, coverage component 206 can determine one or more coverage metrics associated with annotated API call graph 502 meeting one or more coverage criterion that indicate user interface crawling component 202 should perform additional actions on the user interface with mutated event sequences. Coverage component 206 can identify edge 406c as being annotated as "definitely not covered" and determine that externally visible APIs URL1 406a and URL3 406d are directly connected to edge 406c. Coverage component 206 can determine information associated with edges 406a and 406d recorded by test input recording component 208. For example, information associated with edge 406a can include user interface event sequence that comprises user interface event entry "c_ts1: <enter, title, . . . >", user interface event entry "c_ts2: <enter, category, . . . >", and user interface event entry "c_ts3: <click, search>" that triggered API call to API URL1 406a. Coverage component 206 can provide this user interface event sequence to user interface crawling component 202 for mutation. In another example, information associated with edge 406d can include user interface event sequence comprising user interface event entry "c_ts4: <enter, . . . >", user interface event entry "c_ts5: <select, . . . >", and user interface event entry "c_ts6: <click, . . . >" triggered the API call to API URL3 406c. Coverage component 206 can provide this user interface event sequence to user interface crawling component 202 for mutation. It is to be appreciated that coverage component 206 can provide one or both sequences to user interface crawling component 202 for mutation.

User interface crawling component 202 can mutate an event sequence provided by coverage component 206 with the goal of invoking the externally visible API previously invoked by the user interface event sequence, however, with different parameters and/or different parameter values. For example, user interface crawling component 202 can take as input an event sequence $e_1, \ldots, e_s$, where s is a positive integer greater than zero. User interface crawling component 202 can mutate the event sequence $e_1, \ldots, e_s$ such that user interface event $e_s$ calls the same externally visible API with different parameters and/or different parameter values. In a non-limiting example, user interface crawling component 202 can identify one or more events from an event sequence $e_1, \ldots, e_s$ that contribute parameters to event $e_s$, and mutate at least one of the events that contribute parameters to event $e_s$. In a non-limiting example, user interface crawling component 202 can mutate an event sequence $e_1, \ldots, e_s$ by eliminating one or more user interface events from event sequence $e_1, \ldots, e_s$. In another non-limiting example, user interface crawling component 202 can mutate an event sequence $e_1, \ldots, e_s$ by changing a data value for a user interface event, for example, by selecting a different value from a fixed set of values, entering a different value in a free-form field, or any other action that changes a data value for the user interface event. In another non-limiting example, user interface crawling component 202 can mutate an event sequence $e_1, \ldots, e_s$ by or a user interface event that contributes a parameter to the user interface event $e_s$. User interface crawling component 202 can take into account information about user interface elements on user interfaces associated with the user interface events in making determinations on mutations to perform. For example, the information about the user interface elements can indicate required parameters, limitations on parameter values, relationships between parameters, or any other suitable information about the user interface elements that user interface crawling component 202 can employ in making determinations on mutations to perform.

Event sequence component 204, test input recording component 208, and coverage component 206 can perform functions described above again based on user interface event logs and server-side request logs generated as a results of the user interface crawling component 202 performing actions on the user interface based on the one or more mutated event sequences.

If coverage component 206 determines that the comparison of the one or more coverage metrics with one or more coverage criterion indicates that user interface crawling component 202 should not perform additional actions on the user interface with mutated event sequences, coverage component 206 can provide information regarding the coverage metrics to test input recording component 208 for storage along with the test inputs for the API call graph.

Test input recording component 208 can record the coverage metrics with the test inputs for the API call graph that were stored as indicated above. Test input recording component 208 can also determine edges that are still annotated as "definitely not covered" indicating that these edges were not able to be changed to "definitely covered" nor "possibly covered" through mutated event sequences performed on the user interface. Event sequence component 204 can analyze all or a portion of the aggregated log to identify user interface event entries in the aggregated log that triggered a single API call invocation or an API call invocation sequence.

Referring back to FIG. 2, test execution component 210 can automatically perform testing of the microservices of the microservices-based application using the automatically generated test inputs recorded by test input recording component 208. For example, test execution component 210 can employ an automatically generated test input to invoke an API call or an API call invocation sequence associated with the test input in order to perform testing on all or a portion of the API call or an API call invocation sequence, or microservices associated with the API call or an API call invocation sequence. For example, test execution component 210 can employ an automatically generated test input to invoke an API call invocation sequence to perform resiliency testing on all or a portion of the API in the API call invocation sequence. Resiliency testing performed by test execution component 210 can include in a non-limiting example, timeout pattern tests, bounded retry pattern tests, circuit breaker pattern tests, bulkhead pattern tests, or any other suitable resiliency test for microservices of a microservice-based application. In another example, test execution component 210 can employ an automatically generated test input to invoke an API call invocation sequence to perform integration testing on all or a portion of the APIs and/or microservices associated with the APIs in the API call invocation sequence. For example, test execution component 210 can perform actions on the user interface corresponding to a test input that causes execution of the one or more user interface events, or test execution component 210 can directly issue commands (e.g., HTTP requests or any other suitable commands that generate API calls) corresponding to a test input. Test execution component 210 can automatically validate correct operation of an API and/or microservice based on results of the testing based on success criteria. Success criteria can be API, microservice and/or microservice-based application implementation dependent. In a non-limiting example, success criteria can be based on different metrics such as response times within a threshold, number of errors in a time period, or any other suitable success criteria. It is to be success criteria can be pre-defined, operator specified, and/or dynamically determined by test execution component 210, for example, based on learning algorithms.

Test execution component 210 can generate electronic reports, electronic messages, notifications, and/or displays providing information describing tests executed, results of the executed tests, warnings of failed tests, or any other suitable information relating to tests executed to one or more recipients on one or more devices. For example, test execution component 210 can perform testing on API call graph during a time available prior to deployment in a live environment for employment of the microservices-based application by end users. At the end of the time available, test execution component 210 can transmit a report to one or more recipients on the results of completed testing of a portion of the API. Then test execution component 210 can continue performing testing on the rest of the API call graph. It is to be appreciated that a report can provide information describing tests executed, results of the executed tests, warnings of failed tests, recommendation regarding whether to deploy the microservices-based application to live environment, or any other suitable information relating to tests. Test execution component 210 can make determinations related to recommendations regarding whether to deploy the microservices-based application to live environment based upon a utility (e.g., cost/benefit) analysis and/or risk analysis associated with the results of the executed tests.

While FIGS. 1 and 2 depict separate components in server device 102, it is to be appreciated that two or more components can be implemented in a common component. Further, it is to be appreciated that the design of the server device 102 can include other component selections, component placements, etc., to facilitate automatically generating test inputs for testing of microservices of a microservices-based application and automatically testing a large and complex API call graph associated with the microservices-based application using the automatically generated test inputs in accordance with one or more embodiments described herein. Moreover, the aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

Further, some of the processes performed may be performed by specialized computers for carrying out defined tasks related to automatically generating test inputs for testing of microservices of a microservices-based application and automatically testing a large and complex API call graph associated with the microservices-based application using the automatically generated test inputs. The subject computer processing systems, methods apparatuses and/or computer program products can be employed to solve new problems that arise through advancements in technology, computer networks, the Internet and the like. The subject computer processing systems, methods apparatuses and/or computer program products can provide technical improvements to systems automatically generating test inputs for testing of microservices of a microservices-based application and automatically testing a large and complex API call graph associated with the microservices-based application using the automatically generated test inputs by improving processing efficiency among processing components in these systems, reducing delay in processing performed by the processing components, and/or improving the accuracy in which the processing systems automatically generating test inputs for testing of microservices of a microservices-based application and automatically testing a large and complex API call graph associated with the microservices-based application using the automatically generated test inputs.

It is to be appreciated that any criteria (e.g., coverage criteria, success criteria, or any other suitable criteria) disclosed herein can be pre-defined, operator specified, and/or dynamically determined, for example, based on learning algorithms.

The embodiments of devices described herein can employ artificial intelligence (AI) to facilitate automating one or more features described herein. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determination.

A classifier can map an input attribute vector, z=(z1, z2, z3, z4, zn), to a confidence that the input belongs to a class, as by f(z)=confidence(class). Such classification can employ a probabilistic and/or statistical-based analysis (e.g., factoring into the analysis utilities and costs) to determinate an action to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence can be employed. Classification as used herein also is inclusive of statistical regression that is utilized to develop models of priority.

Figure 6:
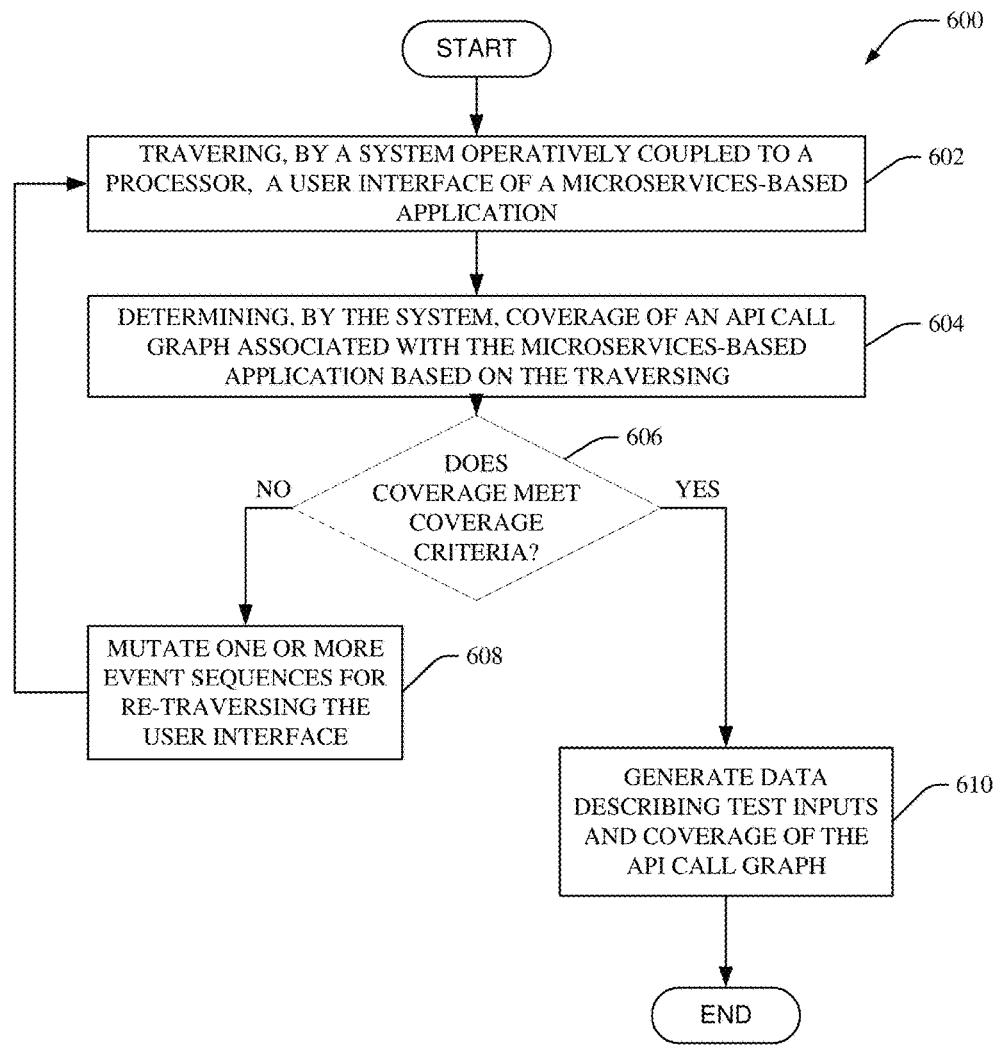
FIG. 6 illustrates a flow diagram of an example, non-limiting computer-implemented method that facilitates automatically generating test inputs for testing of microservices of a microservices-based application in accordance with one or more embodiments described herein.

FIG. 6 illustrates a flow diagram of an example, non-limiting computer-implemented method 600 that facilitates automatically generating test inputs for testing of microservices of a microservices-based application in accordance with one or more embodiments described herein. Repetitive description of like elements employed in other embodiments described herein is omitted for sake of brevity.

At 602, a user interface of a microservices-based application is automatically traversed (e.g., via a user interface crawling component 202, a testing component 104, and/or a server device 102). At 604, coverage of an API call graph associated with the microservices-based application is determined based on the traversing (e.g., via an event sequence component 204, a coverage component 206, a test input recording component 208, a testing component 104, and/or a server device 102). At 606, a decision is made whether the coverage of the API call graph meets coverage criteria (e.g., via a coverage component 206, a testing component 104, and/or a server device 102). If the decision is "YES", meaning the coverage of the API call graph meets the coverage criteria, the method proceeds to reference numeral 610. If the decision is "NO", meaning the coverage of the API call graph does not meet the coverage criteria, the method proceeds to reference numeral 608. At 608, one or more event sequences are mutated for re-traversing the user interface (e.g., via a user interface crawling component 202, an event sequence component 204, a coverage component 206, a test input recording component 208, a testing component 104, and/or a server device 102). At 610, data describing test inputs and coverage of the API call graph are generated (e.g., via a user interface crawling component 202, an event sequence component 204, a coverage component 206, a test input recording component 208, a testing component 104, and/or a server device 102).

Figure 7:
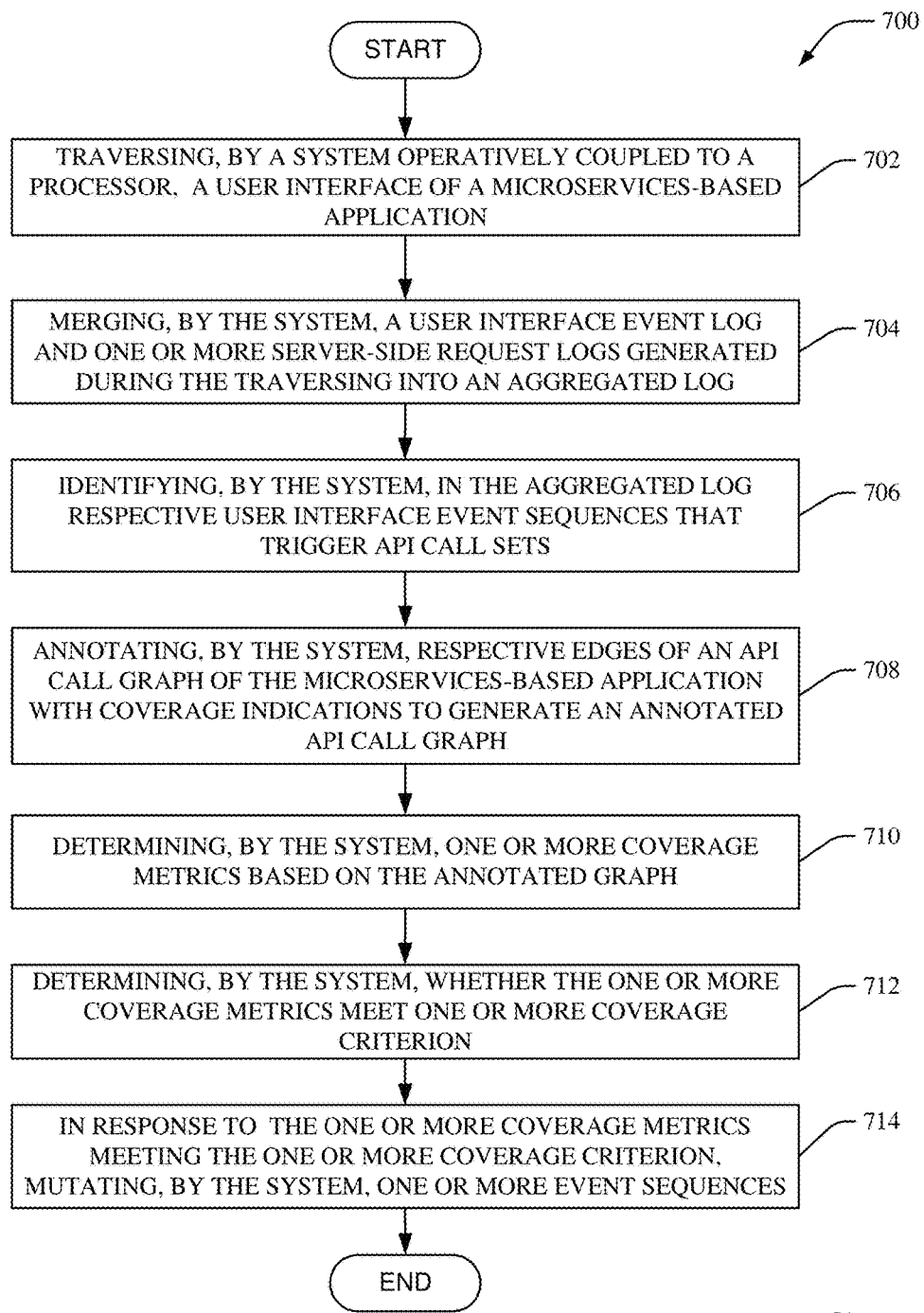
FIG. 7 illustrates a flow diagram of an example, non-limiting computer-implemented method that facilitates automatically mutating an event sequence for generating test inputs for testing of microservices of a microservices-based application in accordance with one or more embodiments described herein.

FIG. 7 illustrates a flow diagram of an example, non-limiting computer-implemented method 700 that facilitates automatically mutating an event sequence for generating test inputs for testing of microservices of a microservices-based application in accordance with one or more embodiments described herein. Repetitive description of like elements employed in other embodiments described herein is omitted for sake of brevity.

At 702, a user interface event log and one or more server-side request logs generated during the traversing are merged into an aggregated log (e.g., via a user interface crawling component 202, a testing component 104, and/or a server device 102). At 704, a user interface of a microservices-based application is traversed (e.g., via an event sequence component 204, a testing component 104, and/or a server device 102). At 706, respective user interface event sequences that trigger API call sets are identified in the aggregated log (e.g., via an event sequence component 204, a testing component 104, and/or a server device 102). At 708, respective edges of an API call graph of the microservices-based application are annotated with coverage indications to generate an annotated API call graph (e.g., via an event sequence component 204, a coverage component 206, a testing component 104, and/or a server device 102). At 710, one or more coverage metrics based on the annotated graph are determined (e.g., via a coverage component 206, a testing component 104, and/or a server device 102). At 712, a determination is made whether the one or more coverage metrics meet one or more coverage criterion (e.g., via a coverage component 206, a testing component 104, and/or a server device 102). At 714, in response to the one or more coverage metrics meeting the one or more coverage criterion, one or more event sequences are mutated (e.g., via a user interface crawling component 202, an event sequence component 204, a coverage component 206, a test input recording component 208, a testing component 104, and/or a server device 102).

Figure 8:
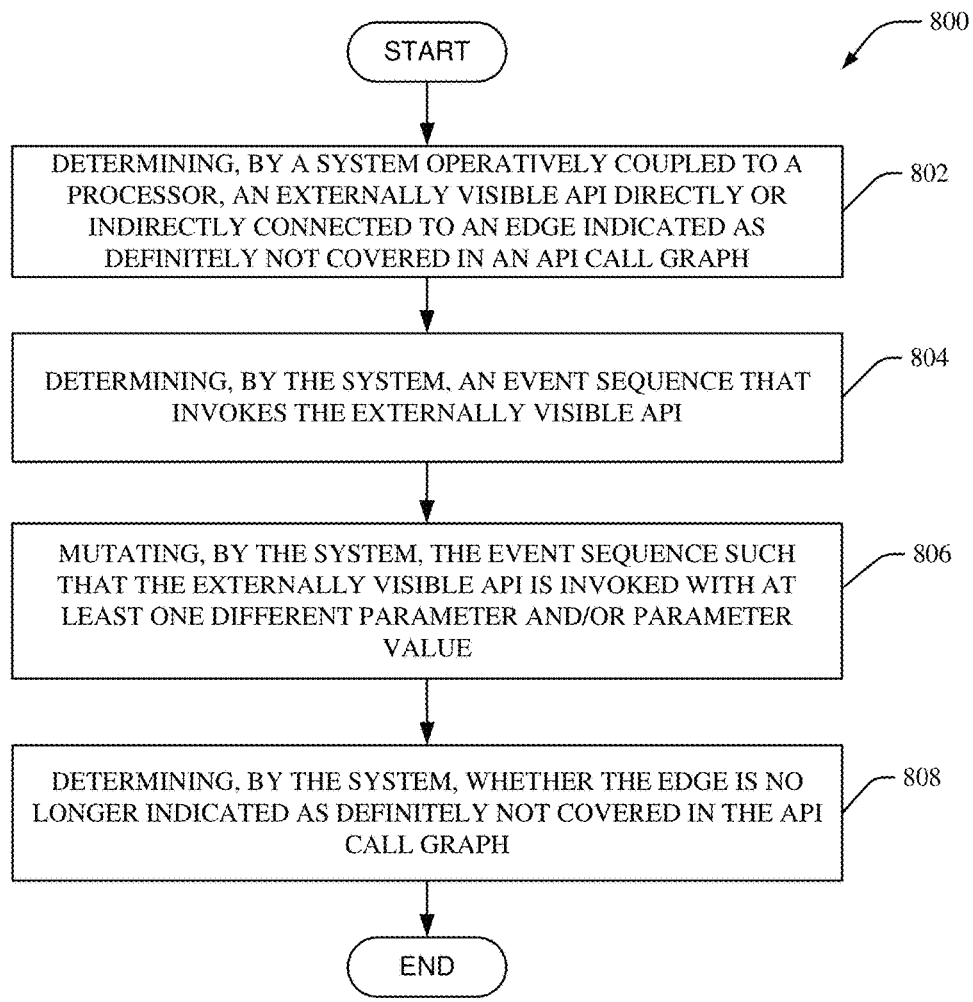
FIG. 8 illustrates a flow diagram of an example, non-limiting computer-implemented method that facilitates automatically identifying an event sequence for mutating to generate test inputs for testing of microservices of a microservices-based application in accordance with one or more embodiments described herein.

FIG. 8 illustrates a flow diagram of an example, non-limiting computer-implemented method 800 that facilitates automatically identifying an event sequence for mutating to generate test inputs for testing of microservices of a microservices-based application in accordance with one or more embodiments described herein. Repetitive description of like elements employed in other embodiments described herein is omitted for sake of brevity.

At 802, an externally visible API directly or indirectly connected to an edge indicated as definitely not covered in an API call graph is determined (e.g., via a coverage component 206, an event sequence component 204, a user interface crawling component 202, a testing component 104, and/or a server device 102). At 804, an event sequence that invokes the externally visible API is determined (e.g., via a coverage component 206, an event sequence component 204, a user interface crawling component 202, a testing component 104, and/or a server device 102). At 806, the event sequence is mutated such that the externally visible API is invoked with at least one different parameter and/or parameter value (e.g., via a coverage component 206, an event sequence component 204, a user interface crawling component 202, a testing component 104, and/or a server device 102). At 808, a determination is made whether the edge is no longer indicated as definitely not covered in the API call graph (e.g., via a coverage component 206, a testing component 104, and/or a server device 102).

Figure 9:
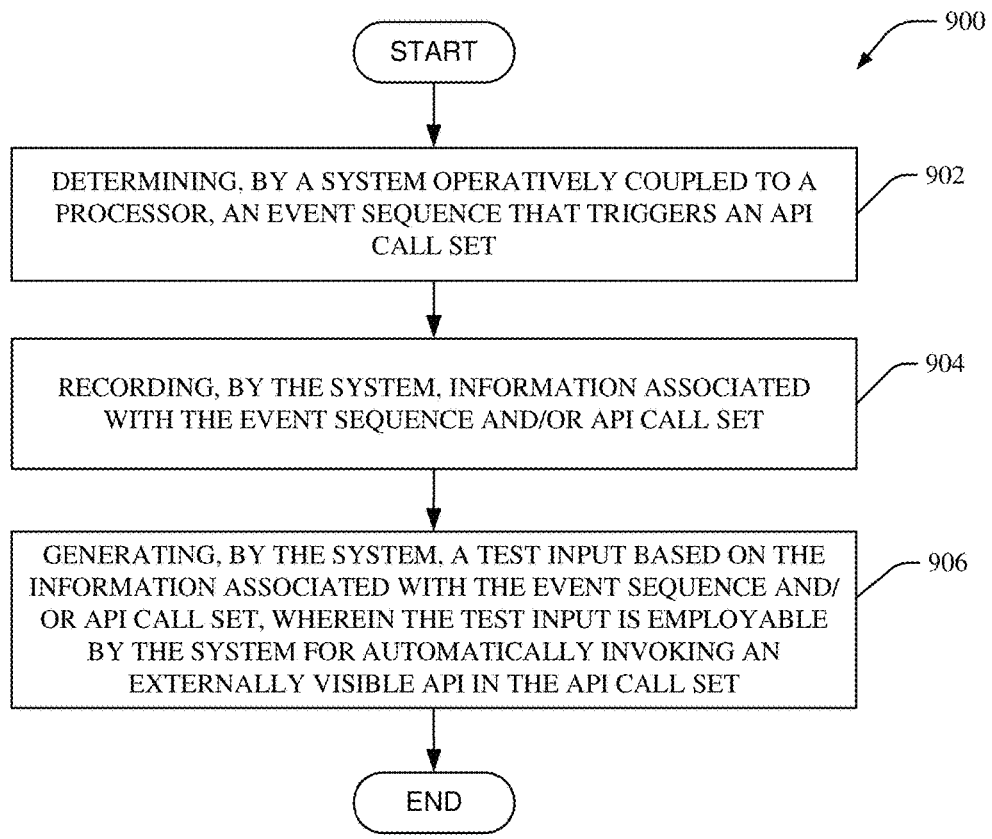
FIG. 9 illustrates a flow diagram of an example, non-limiting computer-implemented method that facilitates automatically generating a test input for testing of microservices of a microservices-based application in accordance with one or more embodiments described herein.

FIG. 9 illustrates a flow diagram of an example, non-limiting computer-implemented method 900 that facilitates automatically generating a test input for testing of microservices of a microservices-based application in accordance with one or more embodiments described herein. Repetitive description of like elements employed in other embodiments described herein is omitted for sake of brevity.

At 902, an event sequence that triggers an API call set is determined (e.g., via a user interface crawling component 202, an event sequence component 204, a coverage component 206, a test input recording component 208, a testing component 104, and/or a server device 102). At 904, information associated with the event sequence and/or API call set is recorded (e.g., via a user interface crawling component 202, an event sequence component 204, a coverage component 206, a test input recording component 208, a testing component 104, and/or a server device 102). At 906, a test input is generated based on the information associated with the event sequence and/or API call set, wherein the test input is employable by the system for automatically invoking an externally visible API in the API call set (e.g., via a test input recording component 208, a testing component 104, and/or a server device 102).

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 10:
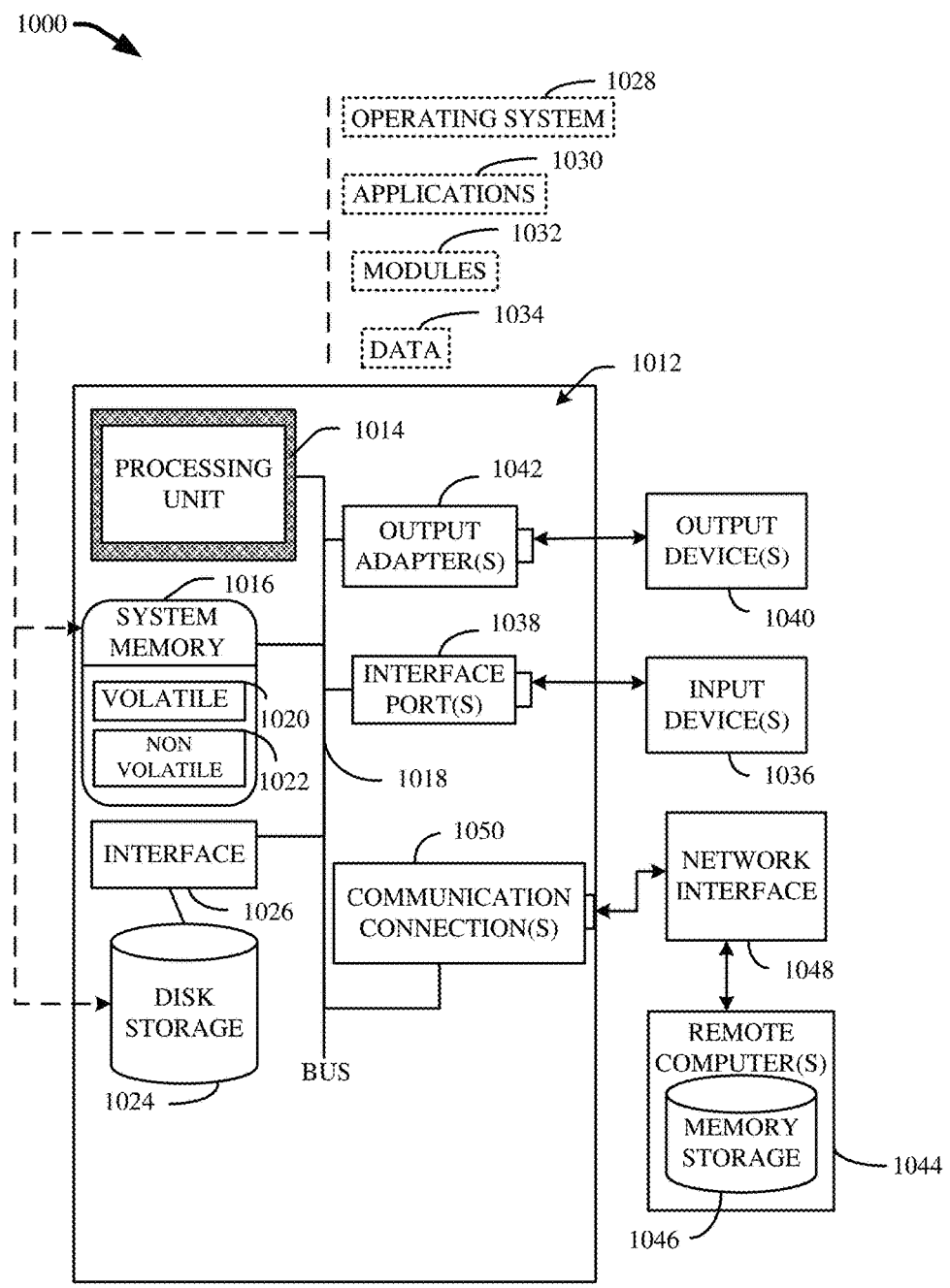
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1094), and Small Computer Systems Interface (SCSI). The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1001. Such software can also include, for example, an operating system 1028. Operating system 1028, which can be stored on disk storage 1024, acts to control and allocate resources of the computer 1012. System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038.

Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A system, comprising:
a memory that stores computer executable components; and
a processor that executes the computer executable components stored in the memory, wherein the computer executable components comprise:

an event sequence component that:
generates an aggregated log of user interface event sequences and application program interface call sets of an application program interface call graph based on a traversal of a user interface of a microservices-based application, and
determines respective user interface event sequences that invoke application program interface call sets based on an analysis of the aggregated log;
a coverage component that generates an annotated application program interface call graph from the application program interface call graph based on the aggregated log, wherein respective edges of the annotated application program interface call graph are annotated with coverage indications; and
a test execution component that tests, within a defined time period prior to deployment of the microservices-based application in a live environment, at least a portion of the application program interface call graph using at least one test input generated based on the user interface event sequences that invoke the application program interface call sets and the coverage indications.

2. The system of claim 1, wherein at least one coverage indication associated with an edge indicates a calling relationship between two application program interfaces represented by the edge, and the calling relationship is invoked by at least one application program interface call set of the application program interface call sets, and wherein the coverage component further determines at least one coverage metric related to the annotated application program interface call graph based on the coverage indications.

3. The system of claim 2, wherein the coverage component further determines that the user interface should be traversed again with one or more mutated event sequences based on the at least one coverage metric and at least one coverage criterion.

4. The system of claim 3, wherein the coverage component further determines an event sequence for mutation, where the event sequence is determined by the coverage component to invoke an externally visible application program interface that is at least one of directly or indirectly connected with an uncovered edge of the annotated application program interface call graph.

5. The system of claim 4, wherein a user interface crawling component mutates the event sequence to invoke the externally visible application program interface with at least one of a different parameter or a different parameter value.

6. The system of claim 5, wherein the user interface crawling component mutates the event sequence by at least one of deletion of an event of the event sequence that contributes at least one parameter to invocation of the externally visible application program interface, addition of an additional event to the event sequence that contributes at least one additional parameter to invocation of the externally visible application program interface, or modification of at least one data value of at least one event of the event sequence.

7. The system of claim 1, wherein the event sequence component further:
obtains a first log generated by the traversal of the user interface comprising user interface events that are timestamped;
obtains a second log generated by the traversal of the user interface comprising application program interface calls that are timestamped; and aggregates user interface events and application program interface calls in time synched order into the aggregated log.

8. A computer-implemented method, comprising:

generating, by a system operatively coupled to a processor, an aggregated log of user interface event sequences and application program interface call sets of an application program interface call graph based on a traversal of a user interface of a microservices-based application;

determining, by the system, respective user interface event sequences that invoke application program interface call sets based on an analysis of the aggregated log;

annotating, by the system, respective edges of the application program interface call graph with coverage indications based on the aggregated log to generate an annotated application program interface call graph; and testing, by the system within a defined time period prior to deployment of the microservices-based application in a live environment, at least a portion of the application program interface call graph using at least one test input generated based on the user interface event sequences that invoke the application program interface call sets and the coverage indications.

9. The computer-implemented method of claim 8, further comprising:

determining, by the system, at least one coverage metric related to the annotated application program interface call graph based on the coverage indications, wherein at least one coverage indication associated with an edge indicates a calling relationship between two application program interfaces represented by the edge, and the calling relationship is invoked by at least one application program interface call set of the application program interface call sets.

10. The computer-implemented method of claim 9, further comprising:

determining, by the system, whether the user interface should be traversed again with one or more mutated event sequences based on the at least one coverage metric and at least one coverage criterion.

11. The computer-implemented method of claim 10, further comprising:

determining, by the system, an event sequence for mutation, wherein the event sequence is determined to invoke an externally visible application program interface that is at least one of directly or indirectly connected with an uncovered edge of the annotated application program interface call graph.

12. The computer-implemented method of claim 11, further comprising:

mutating, by the system, the event sequence to invoke the externally visible application program interface with at least one of a different parameter or a different parameter value.

13. The computer-implemented method of claim 12, wherein the mutating comprises at least one of deleting of an event of the event sequence that contributes at least a parameter to invocation of the externally visible application program interface, adding of an additional event to the event sequence that contributes at least one additional parameter to invocation of the externally visible application program interface, or changing of at least one data value of at least one event of the event sequence.

14. The computer-implemented method of claim 8, wherein the generating the aggregated log comprises:

obtaining, by the system, a first log generated by the traversal of the user interface comprising user interface events that are timestamped;

obtaining, by the system, a second log generated by the traversal of the user interface comprising application program interface calls that are timestamped; and aggregating, by the system, user interface events and application program interface calls in time synchronized order into the aggregated log.

15. A computer program product for automatically generating test inputs for testing of a microservices-based application, the computer program product comprising a computer readable storage medium having program instructions embodied therewith, the program instructions executable by a processing component to cause the processing component to:

generate, by the processing component, an aggregated log of user interface event sequences and application program interface call sets of an application program interface call graph based on a traversal of a user interface of a microservices-based application;

determine, by the processing component, respective user interface event sequences that invoke application program interface call sets based on an analysis of the aggregated log;

annotate, by the processing component, respective edges of the application program interface call graph with coverage indications based on the aggregated log to generate an annotated application program interface call graph; and test, by the processing component, within a defined time period prior to deployment of the microservices-based application in a live environment, at least a portion of the application program interface call graph using at least one test input generated based on the user interface event sequences that invoke the application program interface call sets and the coverage indications.

16. The computer program product of claim 15, wherein the program instructions are further executable by the processing component to cause the processing component to:

determine, by the processing component, at least one coverage metric related to the annotated application program interface call graph based on the coverage indications, wherein at least one coverage indication associated with an edge indicates a calling relationship between two application program interfaces represented by the edge, and the calling relationship is invoked by at least one application program interface call set of the application program interface call sets.

17. The computer program product of claim 16, wherein the program instructions are further executable by the processing component to cause the processing component to:

determine, by the processing component, whether the user interface should be traversed again with one or more mutated event sequences based on the at least one coverage metric and at least one coverage criterion.

18. The computer program product of claim 17, wherein the program instructions are further executable by the processing component to cause the processing component to:

determine, by the processing component, an event sequence for mutation, wherein the event sequence is determined to invoke an externally visible application program interface that is at least one of directly or indirectly connected with an uncovered edge of the annotated application program interface call graph.

19. The computer program product of claim 18, wherein the program instructions are further executable by the processing component to cause the processing component to:
  mutate, by the processing component, the event sequence to invoke the externally visible application program interface with at least one of a different parameter or a different parameter value.

20. The computer program product of claim 19, wherein the mutation of the event sequence comprises at least one of deletion of an event of the event sequence that contributes at least a parameter to invocation of the externally visible application program interface, adding of an additional event to the event sequence that contributes at least one additional parameter to invocation of the externally visible application program interface, or modification of at least one data value of at least one event of the event sequence.

\* \* \* \* \*